(12) United States Patent
Fujikawa et al.

(10) Patent No.: US 12,330,378 B2
(45) Date of Patent: Jun. 17, 2025

(54) MANUFACTURING METHOD FOR OPTICAL UNIT AND MANUFACTURING METHOD FOR OPTICAL MODULE

(71) Applicant: Daicel Corporation, Osaka (JP)

(72) Inventors: Takeshi Fujikawa, Tokyo (JP); Makoto Yasuhara, Tokyo (JP); Sadayuki Fukui, Tokyo (JP)

(73) Assignee: Daicel Corporation, Osaka (JP)

( * ) Notice: Subject to any disclaimer, the term of this patent is extended or adjusted under 35 U.S.C. 154(b) by 202 days.

(21) Appl. No.: 18/210,186

(22) Filed: Jun. 15, 2023

(65) Prior Publication Data

US 2023/0405940 A1    Dec. 21, 2023

(30) Foreign Application Priority Data

Jun. 15, 2022    (JP) .................................. 2022-096875

(51) Int. Cl.
*B29C 65/48*    (2006.01)
*B29C 65/52*    (2006.01)
*B29L 11/00*    (2006.01)

(52) U.S. Cl.
CPC ........ *B29C 65/4845* (2013.01); *B29C 65/526* (2013.01); *B29C 2793/0027* (2013.01); *B29K 2995/0097* (2013.01); *B29L 2011/0016* (2013.01)

(58) Field of Classification Search
CPC .............. B29C 65/4845; B29C 65/526; B29C 65/4835; B29C 65/5057
USPC ...................................................... 156/275.5
See application file for complete search history.

(56) References Cited

U.S. PATENT DOCUMENTS

2013/0038881 A1    2/2013  Pesach et al.
2021/0293533 A1*   9/2021  Pesach .................. G01B 11/25

* cited by examiner

*Primary Examiner* — James D Sells
(74) *Attorney, Agent, or Firm* — Morgan, Lewis & Bockius LLP

(57) ABSTRACT

A manufacturing method for an optical unit includes: molding a first wafer in which a plurality of the first optical elements are formed; molding a second wafer in which a plurality of the second optical elements are formed; forming a bonding portion in a first peripheral portion surrounding the first optical element or a second peripheral portion corresponding to the first peripheral portion and surrounding the second optical element; bonding the first wafer and the second wafer with the bonding portion to seal the first optical element and/or the second optical element; and cutting the first wafer and the second wafer at the first and second peripheral portions in a state where the first and second wafers are bonded to each other to dice an optical unit, in which the adhesive in the bonding portion formed in the forming the bonding portion is in a semi-cured state.

11 Claims, 11 Drawing Sheets

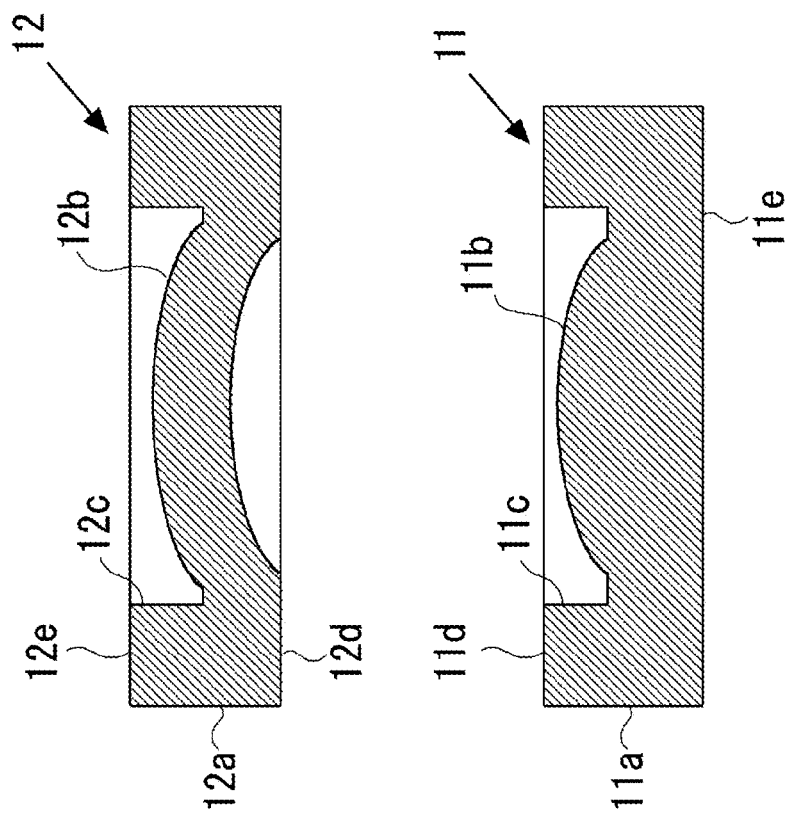
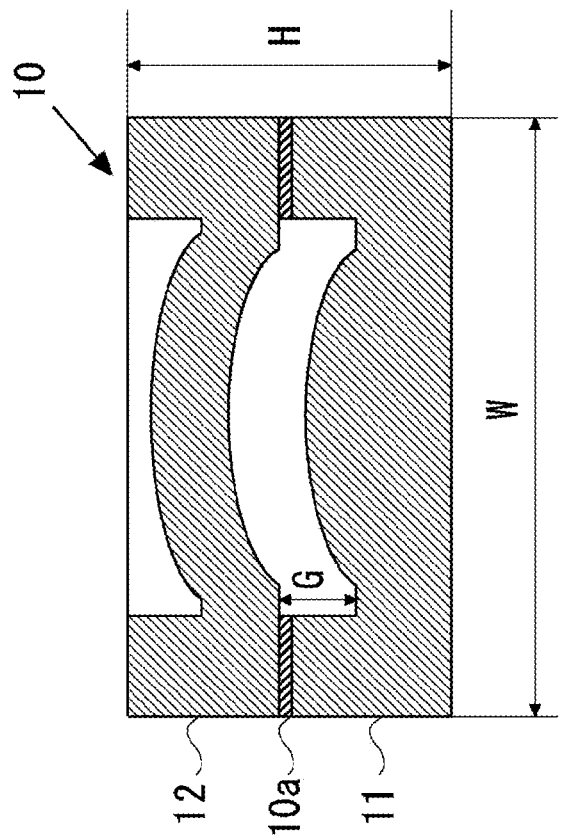
FIG. 2A
FIG. 2B

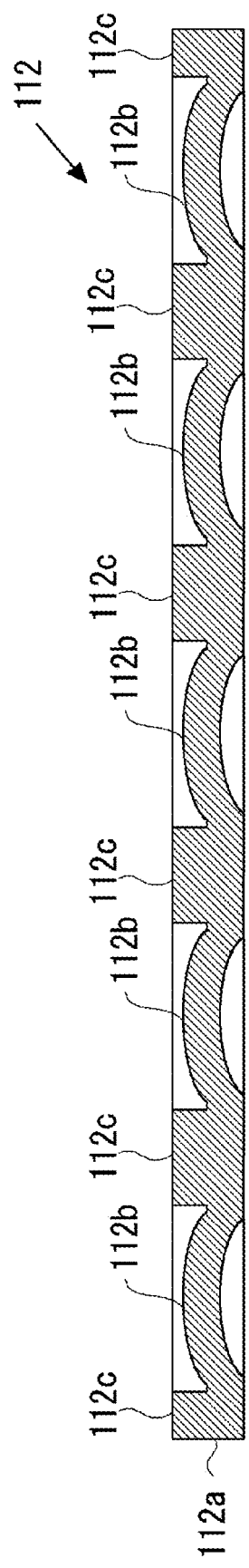
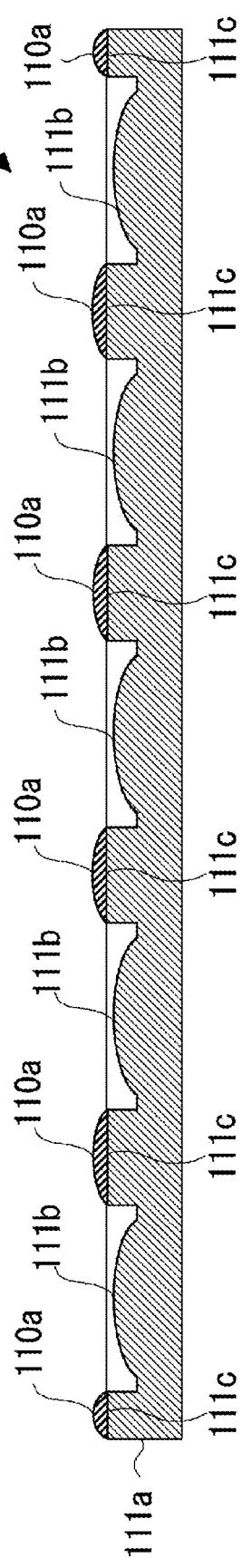
FIG.4A
FIG.4B

| | OPTICAL UNIT 10 | OPTICAL UNIT 20 | OPTICAL UNIT 30 |
|---|---|---|---|
| NUMBER OF OPTICAL ELEMENTS | 2 | 2 | 2 |
| OPTICAL ELEMENT | ASPHERICAL + ASPHERICAL | MLA + ASPHERICAL | DOE + ASPHERICAL |
| STRUCTURE |  |  |  |
| BONDING METHOD | DISPENSE | SCREEN PRINTING | TAPE |
| LENS SHAPE TO BE SEALED | CIRCULAR | SQUARE | CIRCULAR |
| TOP VIEW AFTER APPLICATION OF ADHESIVE |  |  |  |

| | OPTICAL UNIT 40 | OPTICAL UNIT 50 | OPTICAL UNIT 60 |
|---|---|---|---|
| NUMBER OF OPTICAL ELEMENTS | 2 | 3 | 4 |
| OPTICAL ELEMENT | MLA + MLA | MLA + MLA + ASPHERICAL | ASPHERICAL + ASPHERICAL + ASPHERICAL + ASPHERICAL |
| STRUCTURE |  |  |  |
| BONDING METHOD | SCREEN PRINTING | SCREEN PRINTING | DISPENSE + SCREEN PRINTING |
| LENS SHAPE TO BE SEALED | CIRCULAR | SQUARE | CIRCULAR |
| TOP VIEW AFTER APPLICATION OF ADHESIVE |  |  |  |

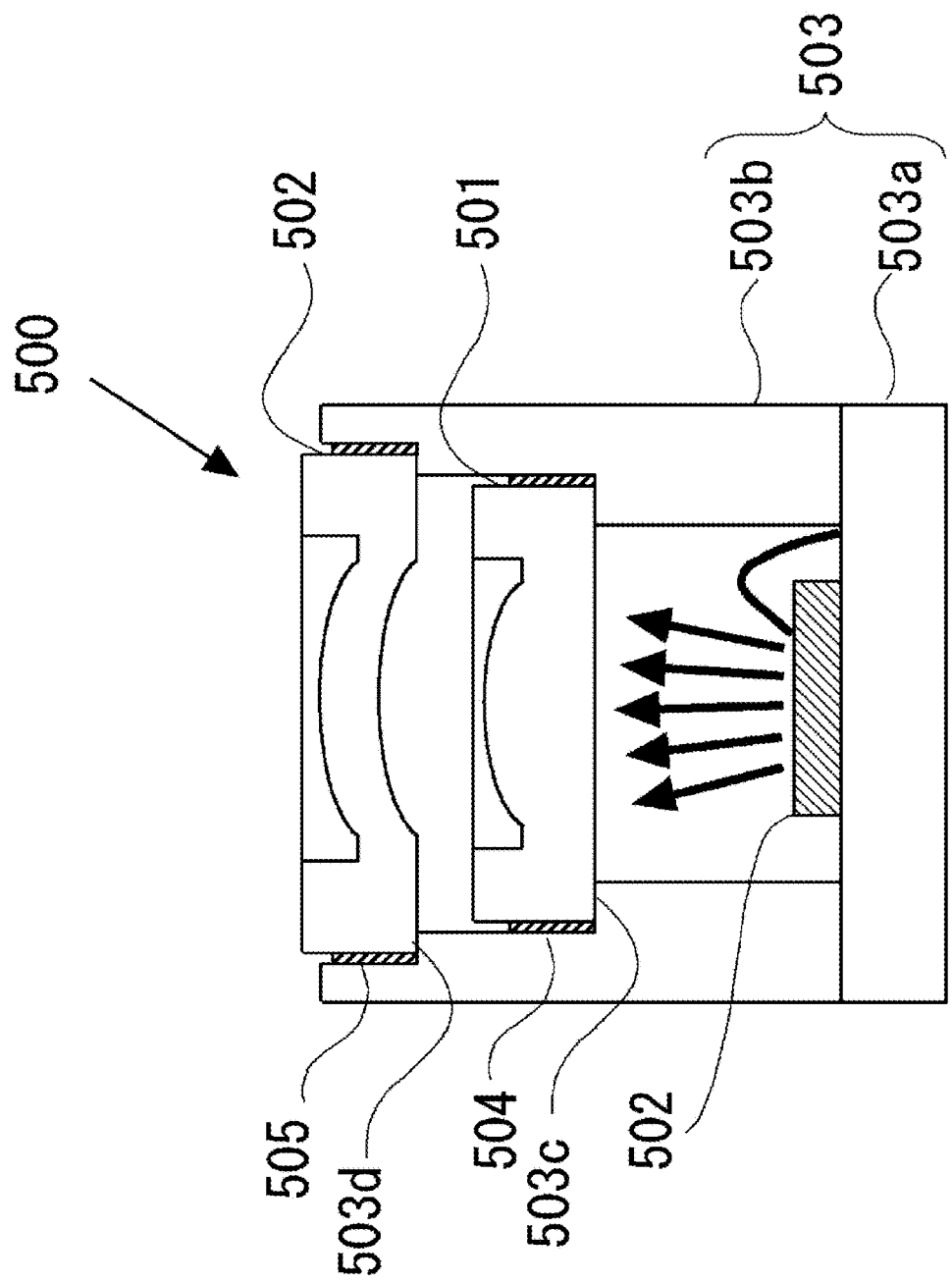

MANUFACTURING METHOD FOR OPTICAL UNIT AND MANUFACTURING METHOD FOR OPTICAL MODULE

CROSS-REFERENCE TO RELATED APPLICATION

This application is based upon and claims the benefit of priority of the prior Japanese Patent Application No. 2022-096875, filed on Jun. 15, 2022, the entire contents of which are incorporated herein by reference.

TECHNICAL FIELD

The present invention relates to a manufacturing method for an optical unit having a plurality of optical elements, and a manufacturing method for an optical module including the optical unit and a light source.

BACKGROUND ART

In recent years, demand for 3D sensing for recognizing a three-dimensional shape of an object such as face authentication and space authentication has increased. As a method of 3D sensing, a time of flight (TOF) method, a structured light method, and the like are adopted. In these methods, distance measurement is performed by irradiating a target object with light from a laser light source such as a vertical cavity surface emitting laser (VCSEL) via an optical element, and detecting reflected light.

As an optical element used for the 3D sensing, in addition to an aspherical lens, a diffractive optical element (DOE), and a micro lens array (MLA) in which a plurality of optical elements are arranged are known. This diffractive optical element is used for the purpose of condensing light from a light source in a predetermined pattern, and the micro lens array is often used for the purpose of optically uniformizing the light from the light source (hereinafter, the diffractive optical element and the micro lens array are collectively referred to as micro-optical element. A function of condensing light from a light source in a predetermined pattern and optically uniformizing the light from the light source is hereinafter also referred to as an optical characteristic function).

Then, in a case of using, as a light source, a surface light source having strong directivity such as the VCSEL as described above, for example, in a case of a DOE that emits a dot pattern, when light with strong directivity enters, the pattern also becomes light having directivity, and thus there has been a case where the pattern becomes blurred and desired optical characteristics cannot be obtained. On the other hand, in a case of an MLA that emits uniform light, when light with strong directivity enters, the irradiation pattern becomes blurred, and there has been a case of an occurrence of false recognition of a camera or efficiency drop. In a case of an aspherical lens, reduction of the influence of aberration may be difficult in a case where the directivity of the incident light is strong.

On the other hand, a collimator element having a collimating function may be used in combination to make incident light entering an aspherical lens or a micro-optical element parallel light. However, in a related art, an optical module including a plurality of optical components has been provided by assembling a collimator element and an aspherical lens or a micro-optical element to a holder as separate components. Therefore, the manufacturing process becomes complicated, and the structure of the optical module becomes complicated, which may hinder reduction in manufacturing cost and improvement in yield (see, for example, Patent Literature 1).

For example, FIG. 11 illustrates a cross-sectional view as a configuration example of a known optical module. An optical module 500 includes an enclosure 503 having a base portion 503a on which a light source 502 is installed and a side wall portion 503b surrounding the light source 502. A first optical element 501 having a collimating function by an aspherical lens is fixed to the side wall portion 503b by placing an end portion on a step portion 503c provided inside the side wall portion 503b and bonding the end portion with an adhesive 504. A second optical element 502 having an optical characteristic function by an aspherical lens is fixed to the side wall portion 503b by placing an end portion on a step portion 503d provided on the further upper side of the step portion 503c provided inside the side wall portion 503b and bonding the end portion with an adhesive 505. As described above, the two optical elements 501 and 502 are separately bonded and fixed to the enclosure 503, which causes an increase in manufacturing cost and a decrease in yield.

To simplify the structure of the optical module, there is an option of providing an optical unit by bonding in advance a collimator element and an aspherical lens or a micro-optical element. However, in that case, when the collimator element is bonded to the aspherical lens or the micro-optical element, the optical performance of each optical element may be affected by flow out of the adhesive or the like.

CITATION LIST

Patent Document

Patent Document 1: US 2013/0038881 A

SUMMARY OF INVENTION

Technical Problem

The technology of the present disclosure has been made in view of the above circumstances, and an object thereof is to provide a technology of reducing manufacturing cost and improving yield in a case where an optical unit is provided by combining a plurality of optical elements. As a result, an object is to provide a technology of reducing manufacturing cost and improving yield of an optical module including the optical unit.

Solution to Problem

The present disclosure for solving the above-described problem is a manufacturing method for an optical unit including a first optical element configured to collimate or shape incident light from a light source and a second optical element configured to diffuse or shape irradiation light from the first optical element, the manufacturing method including:

- molding a first wafer in which a plurality of the first optical elements are formed;
- molding a second wafer in which a plurality of the second optical elements are formed;
- forming a bonding portion with a predetermined adhesive in a first peripheral portion provided and thus surrounding the first optical element in the first wafer or a second peripheral portion corresponding to the first peripheral portion, provided surrounding the second optical element in the second wafer;

bonding the first wafer and the second wafer with the bonding portion to seal the first optical element and/or the second optical element with the first wafer and the second wafer; and cutting the first wafer and the second wafer at the first peripheral portion and the second peripheral portion in a state where the first wafer and the second wafer are bonded to each other to dice an optical unit including the first optical element and the second optical element, wherein the adhesive in the bonding portion formed in the forming the bonding portion is in a semi-cured state.

According to this, in a state where the first wafer and the second wafer are bonded to each other, the first wafer and the second wafer are cut at the first peripheral portion and the second peripheral portion to cut out the optical unit. Therefore, a large number of optical units having a configuration in which the first optical element and/or the second optical element is sealed can more easily or more efficiently be manufactured. Since the adhesive used for bonding the first wafer and the second wafer is in a semi-cured state, the adhesive is suppressed from flowing out of a bonded portion at the time of bonding and from affecting the optical performances of the first optical element and the second optical element. This makes it possible to improve the yield in manufacturing the optical unit.

In the present disclosure, the adhesive in the bonding portion may be a B-stage thermosetting adhesive or a B-stage photocurable adhesive. According to this, the first wafer and the second wafer are bonded to each other using the B-stage thermosetting adhesive or the B-stage photocurable adhesive, whereby the first wafer and the second wafer can be precisely aligned in the semi-cured state of the adhesive. Then, after the first wafer and the second wafer have a desired positional relationship, curing can be completed by applying heat or light. As a result, the yield in manufacturing the optical unit can more reliably be improved.

In the present disclosure, the bonding portion may be formed by screen-printing the adhesive, applying the adhesive with a dispenser, or attaching an adhesive sheet.

In the present disclosure, each of the first optical element and the second optical element may include any of an aspherical lens, a micro lens array, and a diffractive optical element.

In the present disclosure, the first peripheral portion may be a first wall portion protruding and thus surrounding the first optical element. This makes it possible to more stably form the bonding portion on an upper surface of the first wall portion, and the yield in manufacturing the optical unit can more reliably be improved.

In the present disclosure, a width of the optical unit in a direction perpendicular to an optical axis may be in a range of 0.1 mm or greater and 10 mm or less. A total thickness of the first peripheral portion, the second peripheral portion, and the bonding portion may be in a range of 0.05 mm or greater and 5 mm or less. A gap of a space in which the first optical element and/or the second optical element is sealed may be in a range of 0.01 mm or greater and 2 mm or less. This makes it possible to successfully incorporate the optical unit into a measurement device in which, for example, a TOF method, a structured light method, or the like is adopted.

The present disclosure may include fixing, to a holder, an optical unit manufactured by the manufacturing method described above, and a light source of the incident light, to form a module thereof. This makes it possible to manufacture a module that emits light to be diffused or condensed to form a specific pattern with a small number of components, simple man-hours, and low cost. In this case, the light source of the incident light may be a vertical cavity surface emitting laser light source. This makes it possible to provide an optical module with lower power consumption and lower cost.

The present disclosure may be an optical unit manufactured by the manufacturing method described above, in which end surfaces of side surfaces of the first peripheral portion and the second peripheral portion have an identical cut surface.

Note that, in the present invention, wherever possible, the techniques for solving the above-described problem can be used in combination.

Advantageous Effects of Invention

According to the present disclosure, in a case of providing an optical unit by combining a plurality of optical elements, the manufacturing cost or the yield can be reduced. As a result, the manufacturing cost of the optical module including the optical unit can be reduced or the yield thereof can be improved.

BRIEF DESCRIPTION OF DRAWINGS

FIG. 2A and FIG. 2B are configuration examples of a first optical element, a second optical element, and an optical unit according to the present disclosure.

FIG. 4A and FIG. 4B are schematic cross-sectional views illustrating that a bonding portion is provided between the first optical wafer and the second optical wafer according to the present disclosure.

FIG. 11 is a cross-sectional view illustrating a schematic configuration of a known optical module.

DESCRIPTION OF EMBODIMENTS

Hereinafter, a manufacturing method for an optical unit and a manufacturing method for an optical module according to an embodiment of the present disclosure will be described with reference to the drawings. Note that each of the configurations, combinations thereof, and the like in the embodiment are an example, and various additions, omissions, substitutions, and other changes may be made as appropriate without departing from the spirit of the present disclosure. The present disclosure is not limited by the embodiment and is limited only by the claims.

Figure 1:
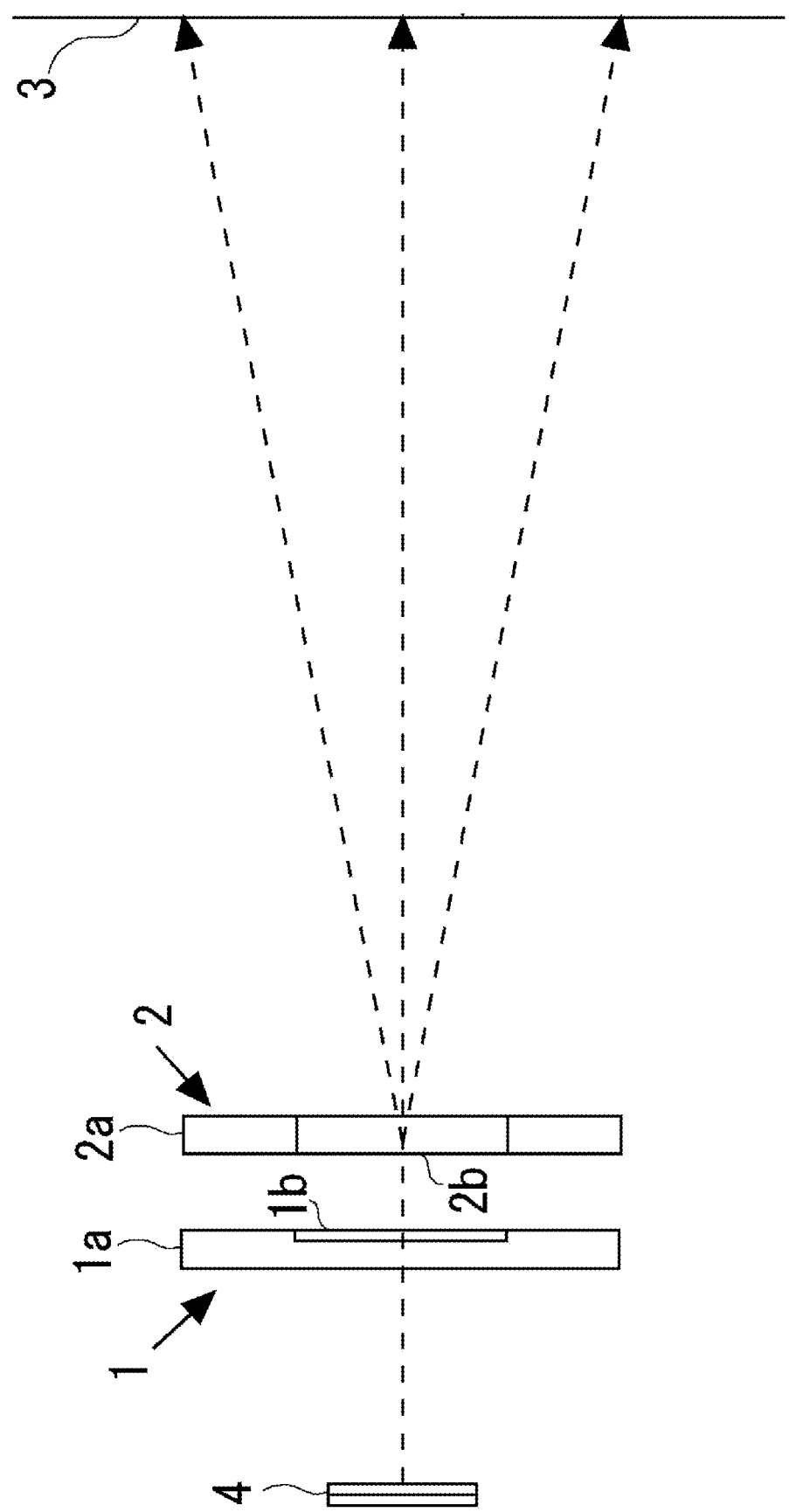
FIG. 1 is a schematic view illustrating a system that causes light emitted from a light source to pass through an optical element and irradiates a target object with the light.

FIG. 1 is a schematic view of a system that causes light emitted from a light source 4 to pass through optical portions 1 and 2 and irradiates a target object (or an evaluation screen) 3 with the light. Here, the light source 4 is, for example, a vertical cavity surface emitting laser (VCSEL) light source. The light source 4 has directivity of, for example, about ±5 degrees, ±10 degrees, or ±20 degrees, but the level of directivity is not particularly limited. The optical portion 1 includes a collimating portion 1b as an optical element that converts incident light from the light source 4 into parallel light on a first surface of a base material 1a opposite to the light source 4.

The optical portion 2 includes an optical characteristic portion 2b as an optical element having a characteristic of causing the parallel light having passed through the collimating portion 1b to be diffused or condensed to form a predetermined pattern on the first surface of a base material 2a opposite to the light source 4, a second surface on the light source 4 side, or both the first surface and the second surface. The light having passed through the optical portions 1 and 2 is diffused with respect to an optical axis, for example, and emitted on the target object 3 with uniform intensity, or condensed to form a predetermined pattern (e.g., dot pattern) on the target object 3.

Examples of the collimating portion 1b include an aspherical lens and a diffractive optical element. Examples of the optical characteristic portion 2b include a diffractive optical element and a micro lens array in addition to an aspherical lens. The diffractive optical element is to change a traveling direction of light by using a diffraction phenomenon of light such as a grating hologram, and is to diffract light by a periodic structure (diffraction groove) formed on the first surface of the base material 1a or the first surface or the second surface of the base material 2a to shape arbitrary structure light. The micro lens array has a structure in which a plurality of micro lenses having a size of about several tens of micrometers are arranged, and has a function of diffusing and uniformizing incident light. Each micro lens constituting the micro lens array may have the same shape, or the micro lens array may have a random structure in which micro lenses having different shapes are arranged.

FIG. 2A and FIG. 2B are to describe configuration examples of a first optical portion 11 and a second optical portion 12 in the present embodiment. FIG. 2A individually illustrates the first optical portion 11 and the second optical portion 12 in the present embodiment. The first optical portion 11 includes an aspherical lens 11b as a first optical element having a collimating function on a surface of a base material 11a opposite to a light incident surface. A first wall portion 11c as a first peripheral portion is provided around the aspherical lens 11b. The first wall portion 11c has a rectangular shape in plan view, and has a planar upper surface 11d on a first surface opposite to the light source 4. Note that a second surface of the first optical portion 11 on the light source 4 side is an entire plane surface 11e.

The second optical portion 12 includes an aspherical lens 12b as a second optical element having an optical characteristic function of diffusing or condensing parallel light on both a second surface that is a light incident surface and a first surface that is a surface opposite to the incident surface of a base material 12a. A second wall portion 12c as a second peripheral portion is provided around the aspherical lens 12b. The second wall portion 12c has a rectangular shape in plan view, has a planar bottom surface 12d on a second surface on the light source side, and has a planar upper surface 12e on a first surface opposite to the light source.

FIG. 2B illustrates an optical unit 10 in which the first optical portion 11 and the second optical portion 12 are bonded and integrated. In the optical unit 10, the first optical portion 11 and the second optical portion 12 are bonded and coupled by a bonding layer 10a. The bonding layer 10a is formed by disposing an adhesive on the upper surface 11d of the first wall portion 11c of the first optical portion 11 and pressing the bottom surface 12d of the second wall portion 12c of the second optical portion 12 from above. Note that the materials of the first optical portion 11 and the second optical portion 12 are not particularly limited, but a photocurable resin composition or a thermosetting resin composition can be used. A glass material may be partially used.

The size (W in FIG. 2B) of the optical unit 10 in a direction perpendicular to the optical axis may be in a range from 0.1 mm to 10 mm. In consideration of incorporation of the optical unit 10 into a measurement device or the like, a range from 0.3 mm to 5 mm is more desirable. The height (H in FIG. 2B) of the optical unit 10 may be in a range from 0.05 mm to 5 mm. In consideration of incorporation of the optical unit 10 into a measurement device or the like, a range from 0.1 mm to 3 mm is more desirable. The gap (G in FIG. 2B) of a space sealed between the first optical portion 11 and the second optical portion 12 may be in a range from 0.01 mm to 2 mm. In consideration of incorporation of the optical unit 10 into a measurement device or the like, a range from 0.02 mm to 1 mm is more desirable.

Figure 3A:
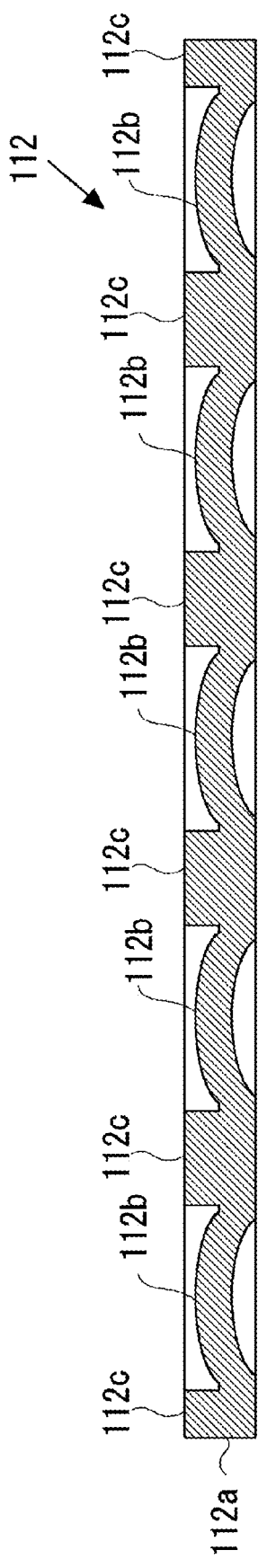
FIG. 3A and FIG. 3B are schematic cross-sectional views of a first optical wafer and a second optical wafer according to the present disclosure.
Figure 3B:
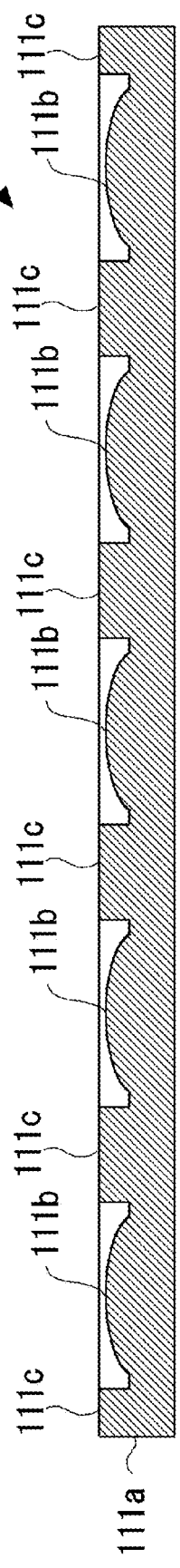

Next, a manufacturing method for the optical unit 10 will be described more specifically with reference to FIG. 3A, FIG. 3B, FIG. 4A, FIG. 4B, FIG. 5, FIG. 6, FIG. 7. FIG. 3B illustrates a first optical wafer 111, serving as a base for manufacturing the plurality of first optical portions 11, the first optical wafer 111 on which a first optical surface 111b to be the aspherical lens 11b and a first plane surface 111c to be the first wall portion 11c are formed. FIG. 3A illustrates a second optical wafer 112, serving as a base for manufacturing the plurality of second optical portions 12, the second optical wafer 112 on which a second optical surface 112b to be the aspherical lens 12b and a second plane surface 112c to be the second wall portion 12c.

FIG. 3A and FIG. 3B are views of five first optical surfaces 111b and five second optical surfaces 112b formed from the viewpoint of easy understanding of the first optical wafer 111 and the second optical wafer 112, respectively. However, in reality, from several hundreds to several thousands of the first optical surface 111b and the second optical surface 112b are formed on each of the first optical wafer 111 and the second optical wafer 112. The first optical wafer 111 and the second optical wafer 112 are molded by pressing a thermosetting resin composition or a photocurable resin composition with an upper mold and a lower mold to which the upper and lower shapes of the optical wafers are transferred, and applying heat or light. Here, the first optical wafer 111 corresponds to the first wafer in the present disclosure. The second optical wafer 112 corresponds to the second wafer in the present disclosure. The step of molding the first optical wafer 111 corresponds to the step of the first molding in the present disclosure. The step of molding the second optical wafer 112 corresponds to the second molding in the present disclosure. The first plane surface 111c corresponds to the first peripheral portion in the present disclosure. The second plane surface 112c corresponds to the second peripheral portion in the present disclosure.

Next, in the present embodiment, as illustrated in FIG. 4A and FIG. 4B, an adhesive 110a is disposed on the first plane surface 111c of the first optical wafer 111. This adhesive may be a thermosetting or photocurable adhesive in a semi-cured state (hereinafter, also called a B-stage). The adhesive may be an adhesive sheet. Examples of the thermosetting adhesive include polyurethane-based, polyester-based, phenol-based, epoxy-based, and polyimide-based adhesives, and examples of the photocurable adhesive include epoxy-based, ene-thiol-based, acryl-based, and silicone-based adhesives, but are not particularly limited. An adhesive sheet is applicable. Examples of the adhesive sheet include those in which a PET-based adhesive or a polyester-based adhesive is formed on a release liner, and an adhesive effect is produced by applying heat after attaching or cooling after applying heat, but also in this case, the type is not particularly limited. The step of disposing the adhesive 110a on the first plane surface 111c of the first optical wafer 111 corresponds to the forming the bonding portion in the present disclosure. The disposed adhesive 110a corresponds to the bonding portion in the present disclosure.

Figure 5:
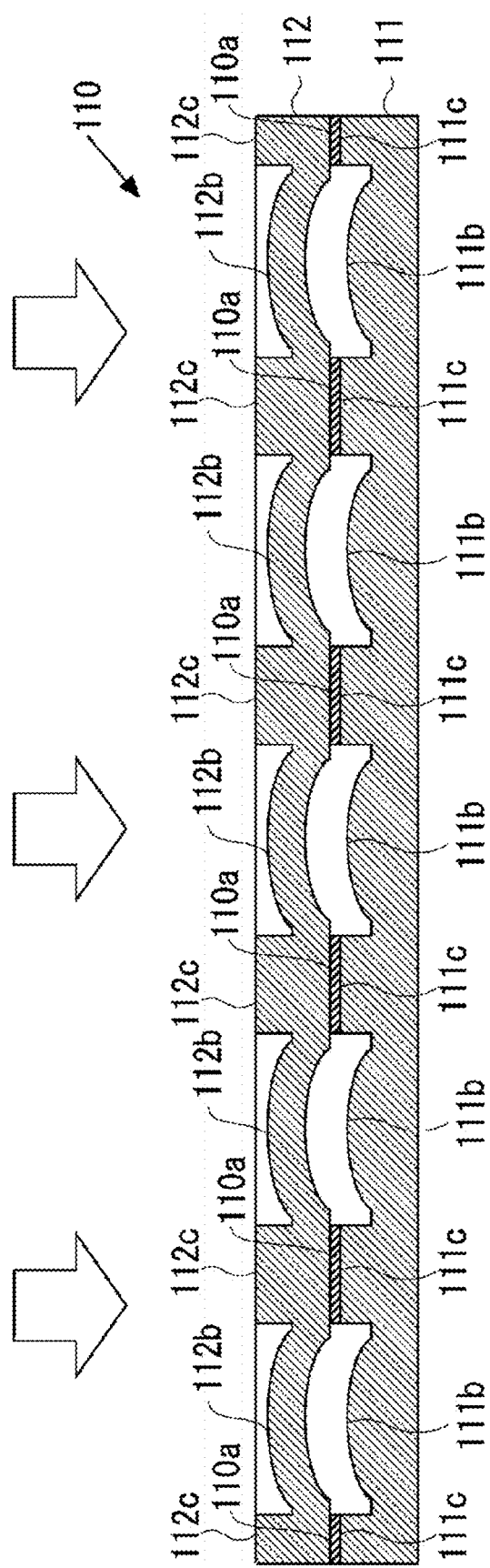
FIG. 5 is a schematic cross-sectional view illustrating that the first optical wafer and the second optical wafer according to the present disclosure are coupled to each other with a bonding layer interposed therebetween.

Then, as illustrated in FIG. 5, the second optical wafer 112 is lowered onto the first optical wafer 111 and thus the adhesive 110a is held between the bottom surface of the second plane surface 112c of the second optical wafer 112 and the upper surface of the first plane surface 111c of the first optical wafer 111. Due to this, an optical wafer unit 110 in which the first optical wafer 111 and the second optical wafer 112 are coupled by the bonding layer formed of the adhesive 110a is formed. This corresponds to the bonding in the present disclosure.

Figure 6:
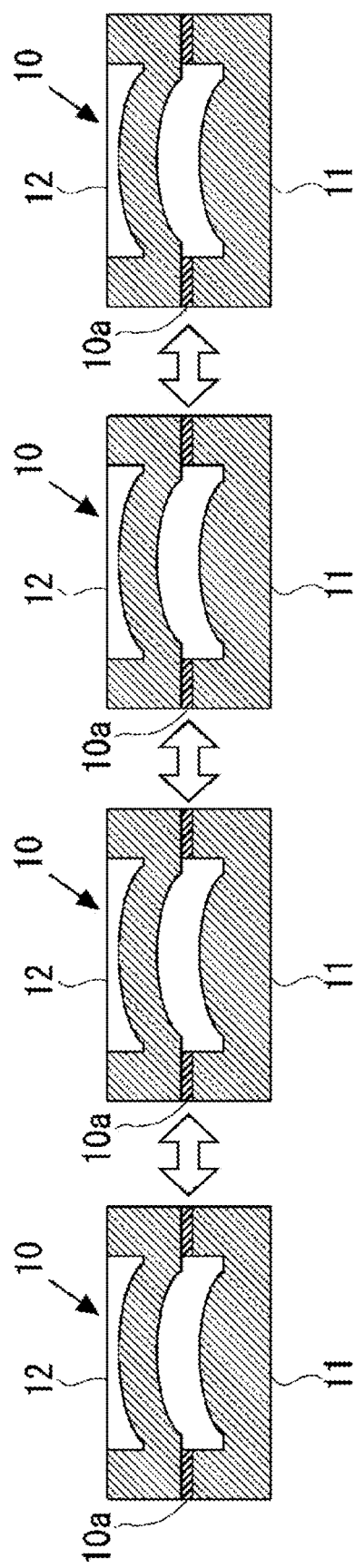
FIG. 6 is a schematic cross-sectional view illustrating that the first optical wafer and the second optical wafer according to the present disclosure that are coupled to each other are cut by dicing.
Figure 7:
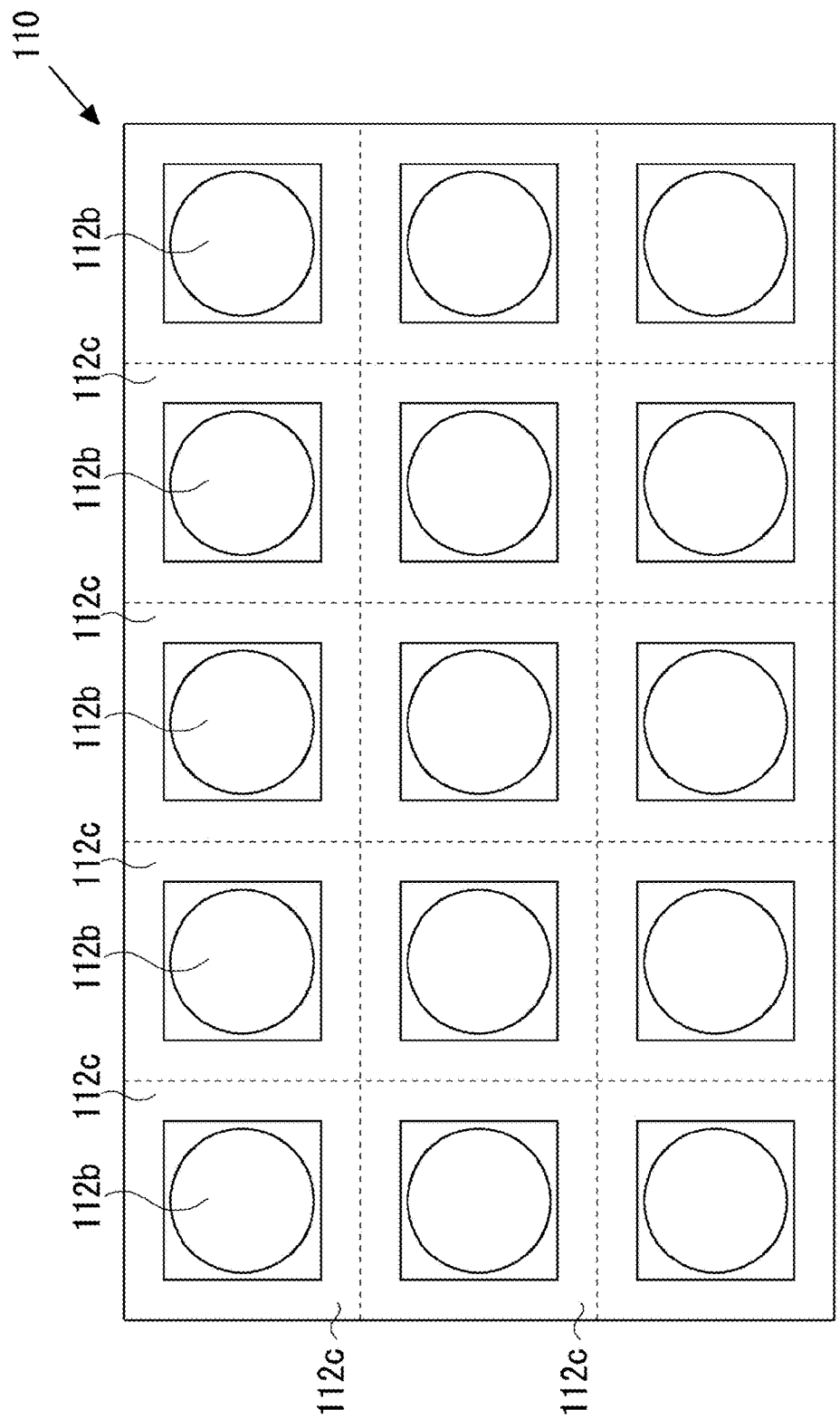
FIG. 7 is a plan view illustrating that the first optical wafer and the second optical wafer according to the present disclosure that are coupled to each other are cut by dicing.

Then, as illustrated in FIG. 6, each optical unit 10 is cut out by cutting the first plane surface 111c and the second plane surface 112c at the center by dicing. FIG. 7 illustrates a plan view of the optical wafer unit 110. In this figure, the second optical wafer 112 coupled to the first optical wafer 111 is in a visible state. The broken lines in the figure indicate lines cut by dicing. By performing dicing along the broken lines, each optical unit 10 can be cut out. As described above, since the first optical portion 11 and the second optical portion 12 in the optical unit 10 are simultaneously cut, the first optical portion 11 and the second optical portion 12 in the optical unit 10 having been cut out have an identical (common) side surface on at least two side surfaces.

Next, a variation of the structure of the optical unit 10 will be described with reference to FIG. 8 and FIG. 9. The optical unit 10 illustrated in the first column of FIG. 8 has been described with reference to FIG. 2A, FIG. 2B, FIG. 3A, FIG. 3B, FIG. 4A, FIG. 4B, FIG. 5, FIG. 6, FIG. 7, and includes two optical members of a first optical portion having a collimating function by an aspherical lens as a first optical element and a second optical portion having an optical characteristic function by an aspherical lens as a second optical element. In the optical unit 10, the adhesive is applied to the first plane surface of the first optical portion by the dispenser. Then, the aspherical lens having a circular shape in plan view is sealed by the first optical portion and the second optical portion. Due to this, the aspherical lens to be sealed is blocked from the outside air, and therefore adhesion and contamination with a foreign matter can be prevented.

Figure 8:
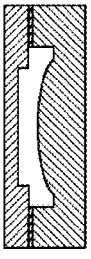
FIG. 8 is a first view for describing a variation of the optical unit according to the present disclosure.
Figure 8:
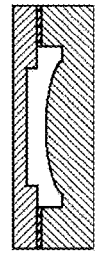
Figure 8:
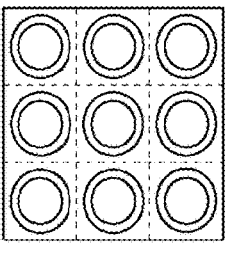
Figure 8:
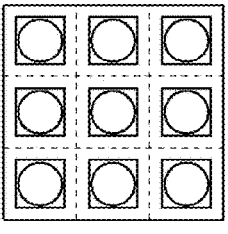
Figure 8:
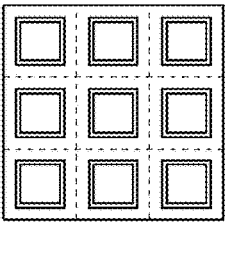
Figure 8:
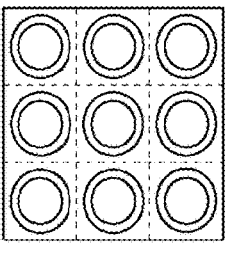

An optical unit 20 illustrated in the second column of FIG. 8 includes two optical members of a first optical portion having a collimating function by an aspherical lens and a second optical portion having an optical characteristic function by an MLA. In the optical unit 20, the adhesive is printed on the first plane surface of the first optical portion by screen printing. Then, the aspherical lens having a rectangular outer shape in plan view is sealed by the first optical portion and the second optical portion. Note that in the second optical portion, the surface on the first optical portion side is provided with a recess portion, and an MLA is formed on the bottom surface of the recess portion.

An optical unit 30 illustrated in the third column of FIG. 8 includes two optical members of a first optical portion having a collimating function by an aspherical lens and a second optical portion having an optical characteristic function by a DOE. In the optical unit 30, the adhesive is disposed by attaching an adhesive tape to the first plane surface of the first optical portion. Then, the aspherical lens having a circular outer shape in plan view is sealed by the first optical portion and the second optical portion. Note that in the second optical portion, the surface on the first optical portion side is provided with a recess portion, and a DOE is formed on the bottom surface of the recess portion. In this case, inner walls of the first plane surface and the second plane surface to be cut by dicing are also circular.

Figure 9:
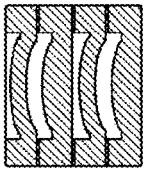
FIG. 9 is a second view for describing a variation of the optical unit according to the present disclosure.
Figure 9:
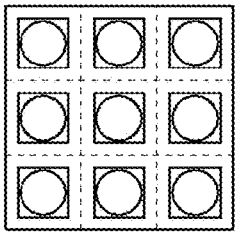
Figure 9:
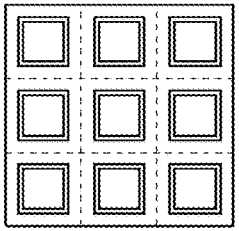
Figure 9:
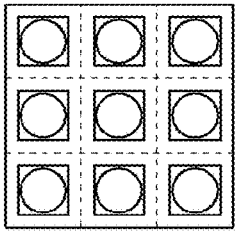
Figure 9:
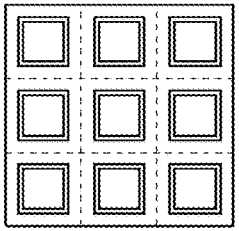
Figure 9:
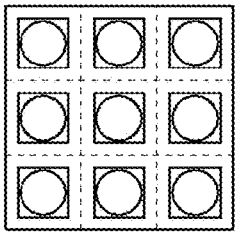

An optical unit 40 illustrated in the first column of FIG. 9 includes two optical elements of a first optical portion having a collimating function by an MLA and a second optical portion having an optical characteristic function by an MLA. In the optical unit 40, the adhesive is printed on the first plane surface of the first optical portion by screen printing. Then, the MLA having a circular outer shape in plan view is sealed by the first optical portion and the second optical portion. In the first optical portion and the second optical portion, surfaces facing each other are provided with recess portions, and an MLA is formed on the bottom surface of each of the recess portions.

An optical unit 50 illustrated in the second column of FIG. 9 includes three optical members of a first optical portion having a collimating function by an aspherical lens, a second optical portion having an optical characteristic function by an MLA, and a third optical portion having an optical characteristic function by an MLA. In the optical unit 50, the adhesive is printed on the first plane surface of the first optical portion by screen printing. Then, the aspherical lens having a rectangular outer shape in plan view is sealed by the first optical portion and the second optical portion. The MLA having a rectangular outer shape in plan view is sealed by the second optical portion and the third optical portion. In the second optical portion and the third optical portion, surfaces facing each other are provided with recess portions, and an MLA is formed on the bottom surface of each of the recess portions.

An optical unit 60 illustrated in the third column of FIG. 9 includes four optical members of a first optical portion having a collimating function by an aspherical lens, a second optical portion having an optical characteristic function by an aspherical lens, a third optical portion having a collimating function by an aspherical lens, and a fourth optical portion having an optical characteristic function by an aspherical lens. In other words, the optical unit 60 has a structure in which two optical units 10 are further stacked. In the optical unit 60, in each optical unit 10, the adhesive is applied to the first plane surface of the first optical portion by the dispenser. For coupling the two optical units 10, the adhesive is printed on the second plane surface of the second optical portion by screen printing.

Then, the aspherical lens having a circular shape in plan view is sealed by the first optical portion and the second optical portion, the second optical portion and the third optical portion, and the third optical portion and the fourth optical portion. Due to this, the plurality of aspherical lenses to be sealed are blocked from the outside air, and therefore adhesion and contamination with a foreign matter can be prevented. In particular, the aspherical lenses in the second optical portion and the third optical portion can seal both front and back surfaces.

Figure 10:
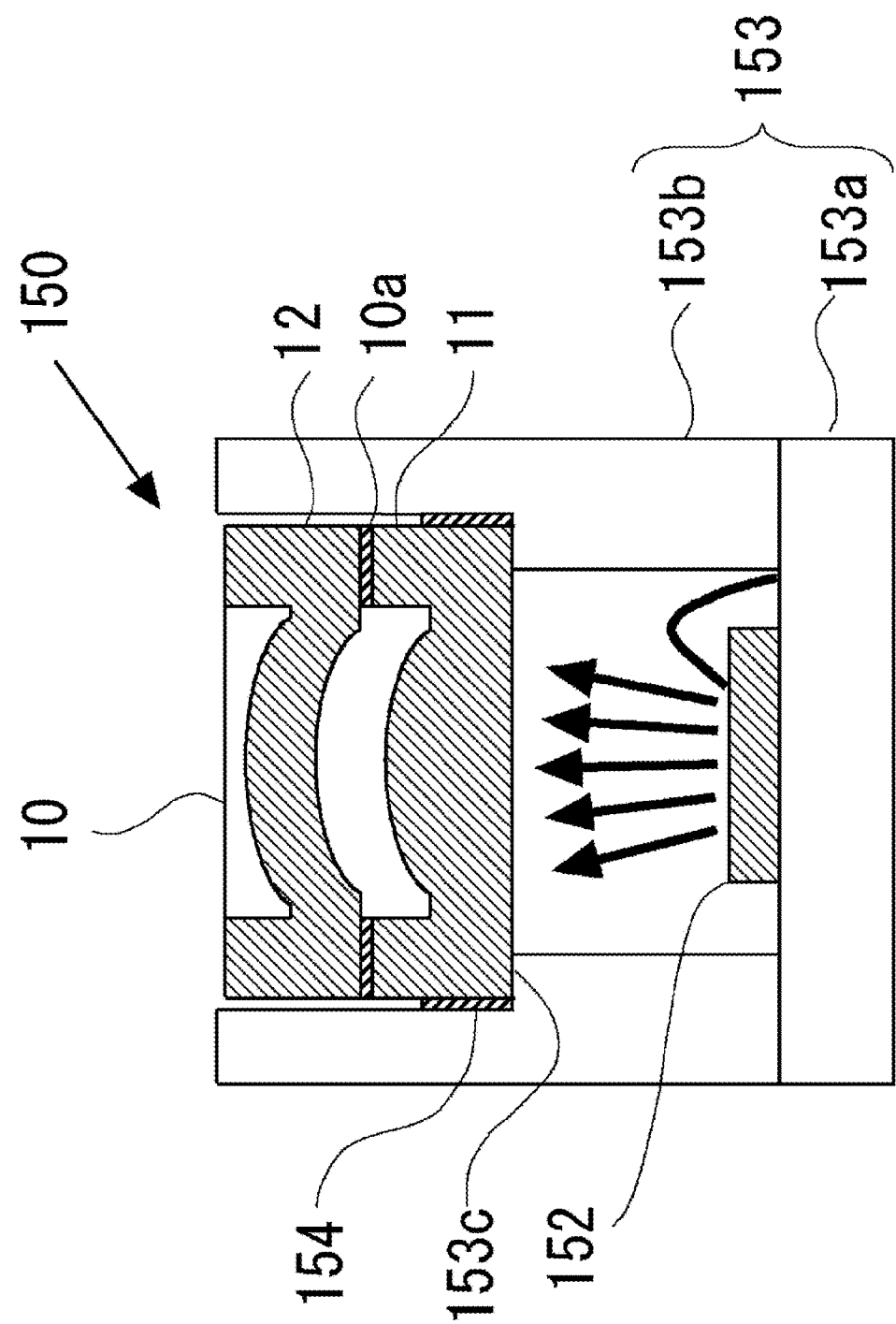
FIG. 10 is a cross-sectional view illustrating a schematic configuration of an optical module according to the present disclosure.

FIG. 10 illustrates a configuration example of an optical module 150 according to the present embodiment. The optical module 150 includes, for example, a base portion 153a on which a light source 152 using a vertical cavity surface emitting laser (VCSEL) light source is installed, and an enclosure 153 having a side wall portion 153b surrounding the light source 152. The optical unit 10 including the first optical portion 11 having a collimating function by an aspherical lens and the second optical portion 12 having an optical characteristic function by an aspherical lens is fixed to the side wall portion 153b by placing an end portion on a step portion 153c provided on the side wall portion 153b and bonded with an adhesive 154.

As described above, in the present embodiment, by bonding and fixing, to the enclosure 153, the optical unit 10 in which the two optical portions 11 and 12 are integrated, the manufacturing process and the structure of the optical module 150 can be simplified. Therefore, it becomes possible to reduce the manufacturing cost and improve the yield. The optical module 150 may be used alone for illumination, or may be used by being incorporated in a measurement device such as a TOF system or a structure light system distance measurement device, or another device. Here, the step of incorporating the light source 152 and the optical unit 10 into the enclosure 153 corresponds to the step of fixing in the present disclosure.

An optical element having a function equivalent to that of the optical element described in the present embodiment may be used as an optical system for image photographing, for face authentication in security equipment, or for space authentication in a vehicle or a robot.

In the above-described embodiment, an example in which the aspherical lens 11b in the first optical portion 11 has a collimating function and the aspherical lens 12b in the second optical portion 12 has an optical characteristic function has been described, but the function sharing between the first optical portion 11 and the second optical portion 12 is not necessarily limited to this. For example, both the first optical portion 11 and the second optical portion 12 have an optical characteristic function, and the collimating function may be omitted.

Wiring of Electrically Conductive Substance

Note that the surface or inside of the optical element according to the present embodiment may be provided with wiring containing an electrically conductive substance, and damage of the optical element may be detected by monitoring the conduction state of the wiring. This makes it possible to easily detect damage such as cracks and release of the optical element, and therefore it makes it possible to prevent in advance damage due to defect or malfunction of an illumination device or a distance measurement device caused by damage of the optical element. For example, by detecting occurrence of a crack in the optical element by disconnection of the electrically conductive substance and prohibiting light emission of the light source, 0th-order light from the light source can be avoided from directly passing through the optical element via the crack and from being emitted to the outside.

The wiring of the electrically conductive substance may be provided on or around the optical element. The electrically conductive substance is not particularly limited as long as it has electrical conductivity, and for example, metal, metal oxide, electrically conductive polymer, an electrically conductive carbon-based substance, or the like can be used.

More specifically, the metal includes gold, silver, copper, chromium, nickel, palladium, aluminum, iron, platinum, molybdenum, tungsten, zinc, lead, cobalt, titanium, zirconium, indium, rhodium, ruthenium, and alloys thereof. Examples of the metal oxide include chromium oxide, nickel oxide, copper oxide, titanium oxide, zirconium oxide, indium oxide, aluminum oxide, zinc oxide, tin oxide, or composite oxides thereof such as composite oxides of indium oxide and tin oxide (ITO) and complex oxides of tin oxide and phosphorus oxide (PTO). Examples of the electrically conductive polymer include polyacetylene, polyaniline, polypyrrole, and polythiophene. Examples of the electrically conductive carbon-based substance include carbon black, SAF, ISAF, HAF, FEF, GPF, SRF, FT, MT, pyrolytic carbon, natural graphite, and artificial graphite. These electrically conductive substances can be used alone, or two or more types thereof can be used in combination.

As the electrically conductive substance, metal or metal oxide that is excellent in conductivity and easily forms wiring is preferable, metal is more preferable, gold, silver, copper, indium, and the like are preferable, and silver is preferable in terms of being mutually fused at a temperature of about 100° C. to be capable of forming wiring excellent in conductivity even on an optical element made of resin. A pattern and a shape of the wiring of the electrically conductive substance are not particularly limited. The pattern may be a pattern surrounding the optical element, or the pattern may have a complicated shape and thus further improves detectability of cracks and the like. Furthermore, the pattern may be a pattern in which at least a part of the optical element is covered with a transparent electrically conductive substance.

REFERENCE SIGNS LIST 1, 11 . . . First optical portion
2, 12 . . . Second optical portion
1a, 2a . . . Base material
1b . . . Collimating portion (First optical element)
2b . . . Optical characteristic portion (Second optical element)
3 . . . Target object
4, 152 . . . Light source
11a, 12a . . . Base material
11b . . . Aspherical lens (First optical element)
11c . . . First wall portion
12b . . . Aspherical lens (Second optical element)
12c . . . Second wall portion
111 . . . First optical wafer
112 . . . Second optical wafer
150 . . . Optical module

The invention claimed is:

1. A manufacturing method for an optical unit including
a first optical element configured to collimate or shape incident light from a light source, and
a second optical element configured to diffuse or shape irradiation light from the first optical element, the manufacturing method comprising:

molding a first wafer in which a plurality of the first optical elements are formed;

molding a second wafer in which a plurality of the second optical elements are formed;

forming a bonding portion with a predetermined adhesive in a first peripheral portion provided surrounding the first optical element in the first wafer or a second peripheral portion corresponding to the first peripheral portion, provided surrounding the second optical element in the second wafer;

bonding the first wafer and the second wafer with the bonding portion to seal the first optical element and/or the second optical element with the first wafer and the second wafer; and cutting the first wafer and the second wafer at the first peripheral portion and the second peripheral portion in a state where the first wafer and the second wafer are bonded to each other to dice an optical unit including the first optical element and the second optical element, wherein the adhesive in the bonding portion formed in the forming the bonding portion is in a semi-cured state.

2. The manufacturing method for an optical unit, according to claim 1, wherein the adhesive in the bonding portion is a B-stage thermosetting adhesive or a B-stage photocurable adhesive.

3. The manufacturing method for an optical unit, according to claim 1, wherein the bonding portion is formed by screen-printing the adhesive, applying the adhesive with a dispenser, or attaching an adhesive sheet.

4. The manufacturing method for an optical unit, according to claim 1, wherein each of the first optical element and the second optical element includes any of an aspherical lens, a micro lens array, and a diffractive optical element.

5. The manufacturing method for an optical unit, according to claim 1, wherein the first peripheral portion is a first wall portion protruding and surrounding the first optical element.

6. The manufacturing method for an optical unit, according to claim 1, wherein a width of the optical unit in a direction perpendicular to an optical axis is in a range of 0.1 mm or greater and 10 mm or less.

7. The manufacturing method for an optical unit, according to claim 1, wherein a total thickness of the first peripheral portion, the second peripheral portion, and the bonding portion is in a range of 0.05 mm or greater and 5 mm or less.

8. The manufacturing method for an optical unit, according to claim 1, wherein a gap of a space in which the first optical element and/or the second optical element is sealed is in a range of 0.01 mm or greater and 2 mm or less.

9. A manufacturing method for an optical module, comprising:

fixing, to a holder, the optical unit manufactured by the manufacturing method according to claim 1, and a light source of the incident light, to form a module thereof.

10. The manufacturing method for an optical module, according to claim 9, wherein the light source of the incident light is a vertical cavity surface emitting laser light source.

11. An optical unit manufactured by the manufacturing method according to claim 1, wherein end surfaces of side surfaces of the first peripheral portion and the second peripheral portion include an identical cut surface.

* * * * *